US011938685B2

(12) United States Patent
Seo

(10) Patent No.: US 11,938,685 B2
(45) Date of Patent: Mar. 26, 2024

(54) WELDING MACHINE FOR SYNTHETIC RESINS

(71) Applicant: Han-na Seo, Seoul (KR)

(72) Inventor: Han-na Seo, Seoul (KR)

( * ) Notice: Subject to any disclaimer, the term of this patent is extended or adjusted under 35 U.S.C. 154(b) by 35 days.

(21) Appl. No.: 17/902,706

(22) Filed: Sep. 2, 2022

(65) Prior Publication Data
US 2023/0158756 A1 May 25, 2023

(30) Foreign Application Priority Data
Nov. 24, 2021 (KR) .................. 10-2021-0163008

(51) Int. Cl.
*B29C 65/00* (2006.01)
*B29C 65/08* (2006.01)

(52) U.S. Cl.
CPC .............. *B29C 66/87* (2013.01); *B29C 65/08* (2013.01); *B29C 66/7292* (2013.01)

(58) Field of Classification Search
CPC ..... B29C 65/08; B29C 65/087; B29C 65/103; B29C 65/72; B29C 65/7832; B29C 66/0242; B29C 66/1122; B29C 66/73; B29C 66/71; B29C 66/7292; B29C 66/73187; B29C 66/73921; B29C 66/816; B29C 66/8167; B29C 66/83416; B29C 66/845; B29C 66/87; B29C 66/9241; B29C 66/92653; B29C 66/9672; B29C 66/9674; B29C 65/085; B29C 65/083; B29C 66/83411; B29L 2031/48; B29K 2023/06; B29K 2027/06
USPC ....... 156/349, 350, 360, 499, 538, 539, 543, 156/555, 556, 580, 580.1, 580.2, 583.1
See application file for complete search history.

(56) References Cited

U.S. PATENT DOCUMENTS 4,975,133 A * 12/1990 Gochermann ........ H01L 31/188
156/580.2
6,325,127 B1 * 12/2001 Waldrop ........... B29C 66/83411
156/515
7,337,938 B2 * 3/2008 Noro ................... B29C 66/1122
228/1.1
(Continued)

FOREIGN PATENT DOCUMENTS

JP 62270320 A 11/1987
KR 20030089794 A 11/2003
(Continued)

*Primary Examiner* — Philip C Tucker
*Assistant Examiner* — Brian R Slawski
(74) *Attorney, Agent, or Firm* — NKL LAW; Jae Youn Kim

(57) ABSTRACT

Disclosed is a welding machine for synthetic resins. The welding machine for synthetic resins performs welding of fabrics using ultrasonic waves and through preheating sufficient not to burn off a coating solution on the surfaces of the fabrics using hot air so as to achieve rapid and firm welding due to concentrated molecular decomposition and melting on the bonding surface between the fabrics, allows both an ultrasonic horn and a welding wheel to be rotated vertically so as to achieve rapid and stable entry of the fabrics and welding of the fabrics while preventing the fabrics from slipping, and achieves stable welding of various fabrics through adjustment of pressing force of the welding wheel depending on the thickness or the material of the fabrics, etc.

4 Claims, 12 Drawing Sheets

(56) References Cited

U.S. PATENT DOCUMENTS

2003/0111157 A1* 6/2003 Ehlert ................ B29C 66/9241
156/73.1
2009/0184140 A1* 7/2009 Liao ........................ A42C 1/00
223/7

FOREIGN PATENT DOCUMENTS

| KR | 20110136352 A | 12/2011 |
| KR | 20190068905 A | 6/2019 |

* cited by examiner

WELDING MACHINE FOR SYNTHETIC RESINS

CROSS-REFERENCE TO RELATED APPLICATION

This application claims priority to and the benefit of Korean Patent Application No. 10-2021-0163008 filed on Nov. 24, 2021, the disclosure of which is incorporated herein by reference in its entirety.

TECHNICAL FIELD

The present invention relates to a welding machine used to join synthetic resins, and more particularly, to a welding machine for synthetic resins which performs ultrasonic welding, and discharges hot air to a gap between synthetic resin fabrics so as to facilitate rapid and precise welding between the synthetic resin fabrics through preheating of the fabrics.

BACKGROUND ART

Recently, as many people actively engage in leisure activities and hobbies, various functional clothes, costumes, shades, tents, etc. are widely being used.

In general, these various types of articles including clothes should basically have a waterproof function, and are manufactured using waterproof fabrics.

These articles, such as functional clothes, costumes, shades, tents, etc., requiring the waterproof function are manufactured using the waterproof fabrics, and may thus prepare for rainy weather through the waterproof function while faithfully performing the original functions thereof.

Therefore, the waterproof fabrics are joined by welding so as to secure water proofness, and heat welding is mainly used as a joining method.

As heat welding methods, hot air welding, ultrasonic welding, high frequency welding, spin welding, vibration welding, etc. are applied.

There among, hot air welding is mainly used to bond a waterproof tape to the sewn part of a fabric, the waterproof tape is melted by applying hot air of a high temperature thereto, and simultaneously, the waterproof tape is bonded to the sewn part of the fabric by allowing the waterproof tape and the fabric to pass through a gap between an upper roller and a lower roller, which are formed of a rubber.

However, hot air welding, in which the high-temperature hot air is discharged to a relatively large area, may be used to bond the waterproof tape having a relatively small thickness to the fabric by melting, but, in the case in which thick fabrics used in tents or the like overlap each other so as to be joined to each other, waterproof coating surfaces around the bonding surface between the fabrics are burned off and thus come off due to excessively hot air.

Particularly, conventional fabrics used in tents, etc. were coated with a waterproof material, i.e., general PE and PVC coating materials, but recently, in order to prevent environmental pollution, polymer coating using eco-friendly substances is applied, and, in case of hot air welding, when weak hot air is applied, the decomposition of a polymer is poor and thus joining is not properly achieved, and, when excessively hot air is applied, the coating surfaces are burned off.

In order to solve the above problems, an ultrasonic welding method in which, when ultrasonic vibration energy is transmitted to work pieces to be welded through an ultrasonic horn, frictional heat is momentarily generated on the between the ultrasonic horn and an upper welding wheel and is thus applied to the bonding surface between the work pieces, and thus, a synthetic resin is melted so that joining between the work pieces is achieved by strong molecular bonding, is applied.

However, in case of the above-described ultrasonic welding method, a sufficient time needs to be taken to provide frictional heat to fabrics, and thus, welding time delay causes reduction in workability.

Further, in the general ultrasonic welding method, since the ultrasonic horn is fixed or horizontally rotated in the state in which the front end surface of the ultrasonic horn is provided in a planar form and the welding wheel is vertically rotated, it may be difficult for fabrics to stably enter a welding space or slip of the fabrics may occur during the entry process of the fabrics, and thereby, welding may not be smoothly performed.

PRIOR ART DOCUMENT

Patent Document (Patent Document 1) Korean Patent Registration No. 10-1139578
(Patent Document 2) Korean Patent Registration No. 10-2088557

SUMMARY OF THE INVENTION

Problems to be Solved

Therefore, the present invention has been made in view of the above problems, and it is an object of the present invention to provide a welding machine for synthetic resins which performs welding of fabrics using ultrasonic waves and through preheating sufficient not to burn off a coating solution on the surfaces of the fabrics using hot air, so as to achieve rapid and firm welding due to concentrated molecular decomposition and melting on the bonding surface between the fabrics.

It is another object of the present invention to provide a welding machine for synthetic resins which allows both an ultrasonic horn and a welding wheel to be rotated vertically, so as to achieve rapid and stable entry of fabrics and stable welding while preventing the fabrics from slipping.

It is yet another object of the present invention to provide a welding machine for synthetic resins which may achieve stable welding of various fabrics through adjustment of pressing force of a welding wheel depending on the thickness or the material of the fabrics, etc.

In accordance with the present invention, the above and other objects can be accomplished by the provision of a welding machine for synthetic resins including a main body including a work table provided at a middle part of the main body so as to protrude toward one side and having a horn withdrawal hole formed there through, and a support arm provided at an upper part of the main body so as to protrude upwardly from the work table, an elevating support provided on the support arm and including a screw mount part configured to protrude from one side of an upper part of the elevating support, and an elevating cylinder configured such that a cylinder rod is provided therein so as to be withdrawn downwards from the elevating cylinder, an ultrasonic generator including a vibrator, a booster and an ultrasonic horn, provided under the work table, rotated vertically by driving a motor, and configured to generate ultrasonic vibration through a circumferential surface of the ultrasonic horn, a welding unit provided on the elevating support, elevated and lowered by operation of the elevating cylinder, and configured to press fabrics and to generate frictional heat in cooperation with the ultrasonic horn so as to join the fabrics, and a hot air generator provided on the elevating cylinder, and rotated leftwards and rightwards to provide hot air to the supplied fabrics, wherein the ultrasonic horn includes a body connected to the booster, and a disc-shaped head configured to protrude outwards from a front end of the body so as to radiate the vibration through a protruding circumference of the head, wherein the head includes a vibration guide plate connected to the front end of the body by a connection curve part having a designated curvature, provided in a disc shape having a greater diameter than a diameter of the body, and having front and rear curve parts having a designated curvature and formed at circumferences of front and rear surfaces of the vibration guide plate so as to expand a thickness of the vibration guide plate, and a vibration radiation part connected to the front and rear curve parts, and having a welding surface formed on an outer circumferential surface of the vibration radiation part.

The welding unit may include an elevating operation plate coupled to the elevating support so as to be slidable upwards and downwards, configured such that the cylinder rod is connected to the elevating operation plate, and having a latch provided on one side of the elevating operation plate, a welding wheel mounted at a lower end of the elevating operation plate by a roller support, rotated vertically in an opposite direction to the ultrasonic generator by driving a motor, and configured to weld the fabrics in cooperation with the ultrasonic horn, a pair of upper and lower fabric guides provided on the roller support and the work table so as to guide entry of the fabrics to be welded, respectively, and a stroke adjuster provided on the elevating support so as to adjust a lowering stroke distance of the elevating operation plate by locking the latch of the elevating operation plate.

The stoke adjuster may include a screw mounted vertically in a screw mount part of the elevating support so that a lower part of the screw is exposed, and having an adjuster handle provided on an upper end of the screw, a stopper screw-coupled to a lower part of the screw, having a spring provided on an upper part of the stopper and a scale measurement table provided at one side of the stopper, and configured such that the stopper ascends and descends using the elevating operation plate as a guide when the screw is rotated, and the latch is latched to an upper part of the stopper when the elevating operation plate is lowered, and a scale mounted on an upper part of the elevating support, and having a measurement rod provided to protrude downwards from the scale and configured to measure the lowering stroke distance of the elevating operation plate through interference with the scale measurement table.

The hot air generator may include a heater rod mount plate provided on an upper surface of the elevating support, a heater rod mounted on the heater rod mount plate by a rotating plate so as to be rotated leftwards and rightwards, and having a hot air discharge nozzle provided at a lower end of the heater rod and configured to discharge hot air to the supplied fabrics so as to preheat the fabrics, and a rotating cylinder mounted on the heater rod mount plate so as to be rotatable, and configured such that a cylinder rod is connected to the rotating plate so as to control rotation of the heater rod.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Terms or words used in the following description and the claims are not interpreted as being limited to usual or dictionary meanings, and are interpreted as having meanings and concepts according with the technical scope of the present invention based on the principle that the inventor(s) can appropriately define the concept of a term so as to describe their own invention in the best mode.

Therefore, embodiments disclosed in the description and the drawings are merely exemplary and do not represent all of the technical scope of the present invention, and thus, it will be understood that there are various equivalents and modifications as substitutes of the embodiments at the time of filing of the present invention.

Hereinafter, the exemplary embodiments of the present invention will be described in detail with reference to the accompanying drawings.

Figure 1:
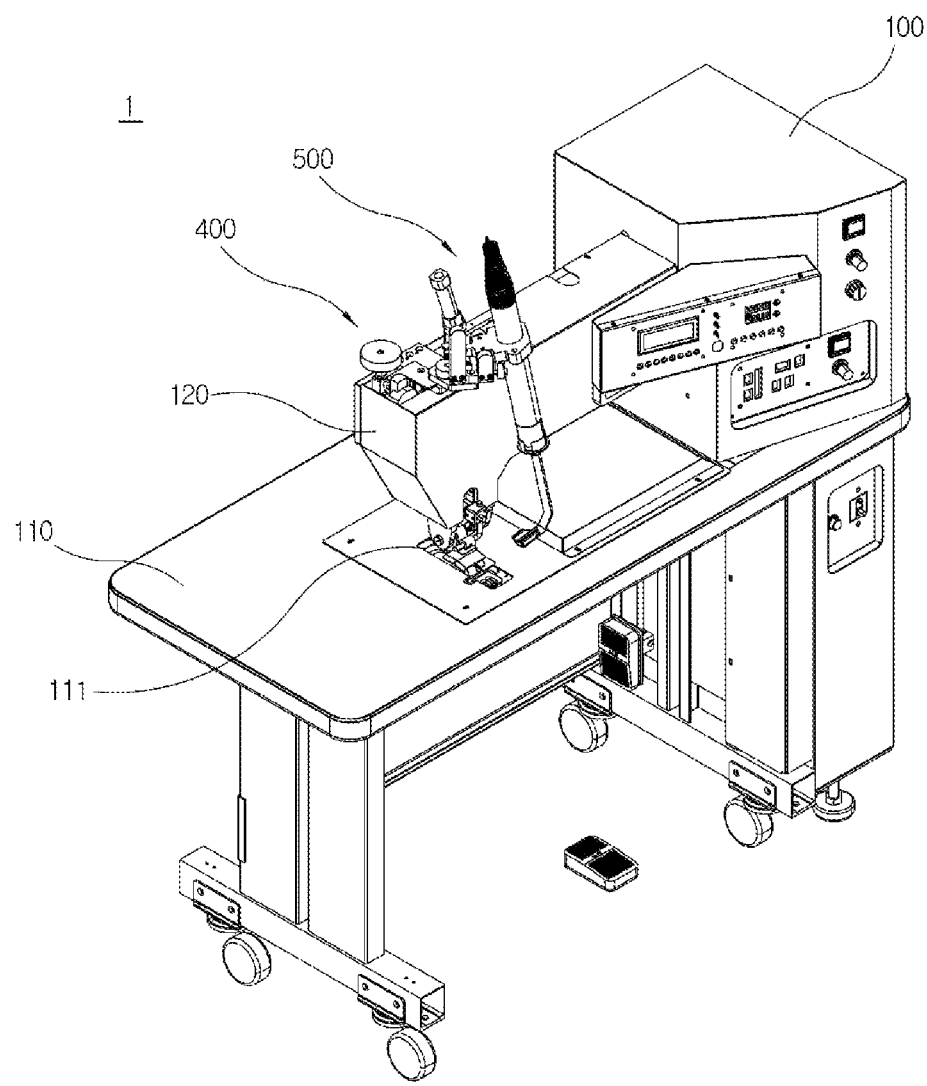
FIG. 1 is a perspective view of a welding machine for synthetic resins according to the present invention.
Figure 2:
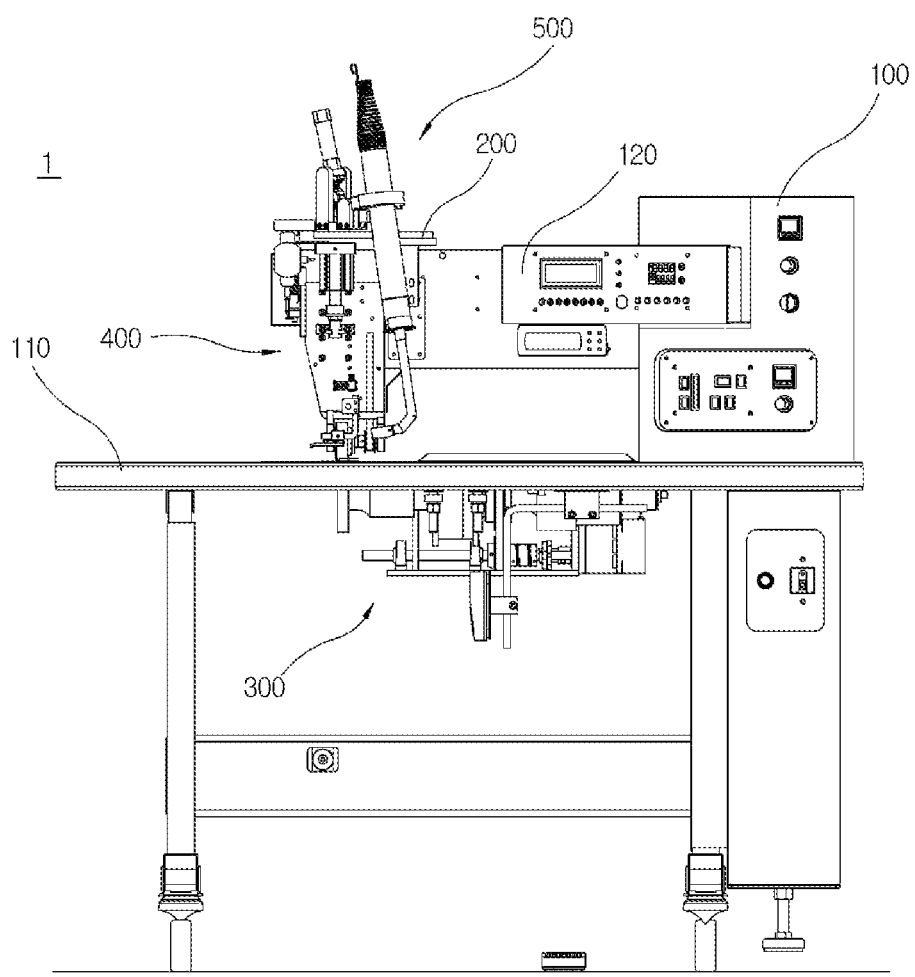
FIG. 2 is a front view of the welding machine for synthetic resins according to the present invention.
Figure 3:
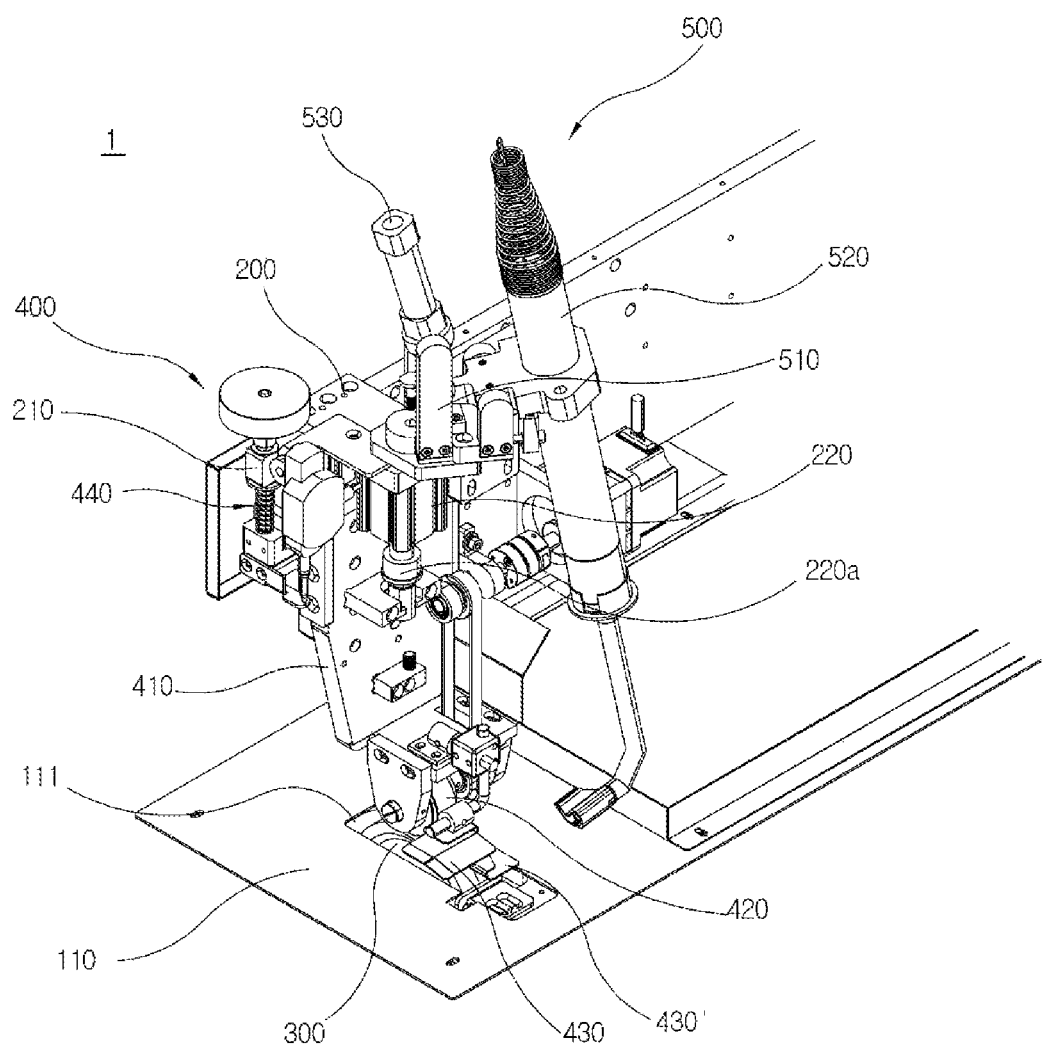
FIG. 3 is a perspective view showing a principal part of the welding machine for synthetic resins according to the present invention.

FIG. 1 is a perspective view of a welding machine for synthetic resins according to the present invention, FIG. 2 is a front view of the welding machine for synthetic resins according to the present invention, and FIG. 3 is a perspective view showing a principal part of the welding machine for synthetic resins according to the present invention.

As shown in FIGS. 1 to 3, a welding machine 1 for synthetic resins according to the preset invention includes a main body 100, an elevating support 200, an ultrasonic generator 300, a welding unit 400, and a hot air generator 500.

First, the main body 100 forms the frame of the welding machine 1 for synthetic resins according to the present invention, and is provided vertically so that a control panel may be provided thereon.

Further, a plate-shaped work table 110, which protrudes to one side, is provided at the middle part of the main body 100, and a horn withdrawal hole 111 configured to induce an ultrasonic horn 330, which will be described later, to be withdrawn upwards there through is formed through the work table 110.

A support arm 120, which horizontally extends above the work table 110, is provided at the upper part of the main body 100.

In addition, switches configured to operate the welding machine 1 for synthetic resins according to the present invention may be provided on the main body 100.

The elevating support 200 of the welding machine 1 for synthetic resins according to the preset invention is configured such that the welding unit 400 and the hot air generator 500, which will be described later, are installed and supported thereon.

In this regard, the elevating support 200 is provided at the end of the support arm 120 in the form of a block, such as a plate, and a screw mount part 210 protrudes from the upper part of one side of the elevating support 200.

The elevating support 200 includes an elevating cylinder 220 configured to elevate and lower the welding unit 400, which will be described later, and a cylinder rod 220a is provided in the elevating cylinder 220 so as to be withdrawn downwards from the elevating cylinder 220.

The ultrasonic generator 300 of the welding machine 1 for synthetic resins according to the present invention is configured to generate ultrasonic waves so as to provide frictional heat.

Figure 4:
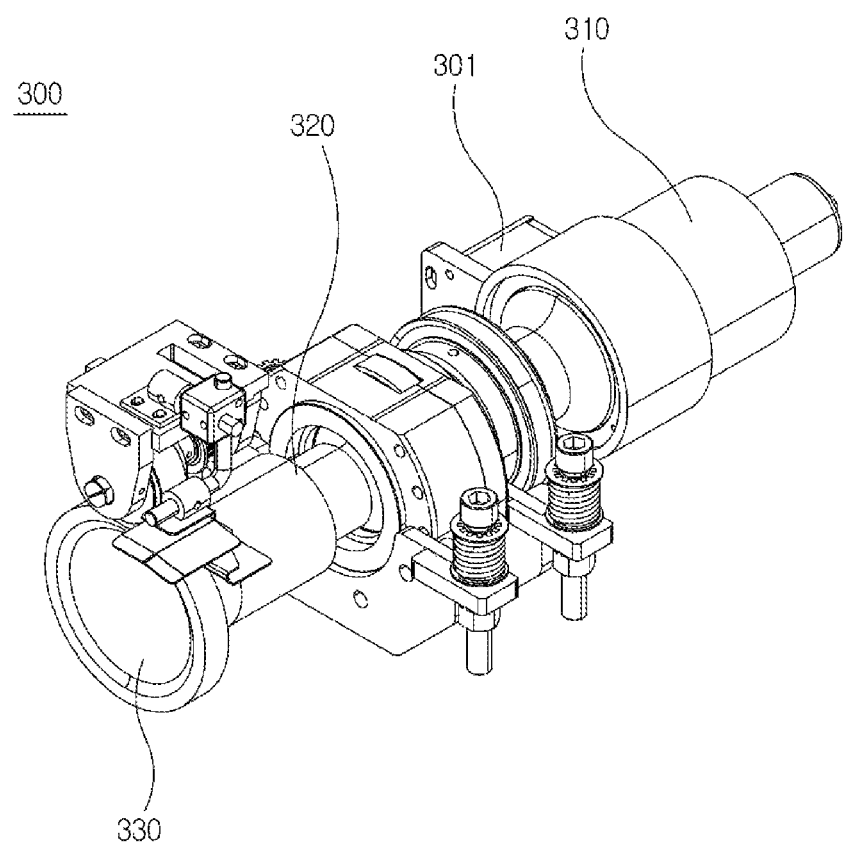
FIG. 4 is a perspective view showing a principal part of an ultrasonic generator of the welding machine for synthetic resins according to the present invention.

For this purpose, referring to FIG. 4, the ultrasonic generator 300 is provided in a cylindrical structure in which a vibrator 310, which is generally used, a booster 320 and the ultrasonic horn 330 are continuously disposed, and, in the present invention, the ultrasonic generator 300 is disposed horizontally under the lower surface of the work table 110, and is configured to be rotated in the vertical direction.

In the present invention, the rotational force of the ultrasonic generator 300 may be generated by driving a motor 310, without being limited thereto, and, for this purpose, the booster 320 is mounted on the lower surface of the work table 110 by a bearing (not shown) or the like, and the motor 301 is driven by a general belt pulley or the like.

Particularly, the ultrasonic horn 330 according to the present invention is configured to generate ultrasonic energy through the circumference thereof not through the front end surface thereof during a process of providing rotational force in the vertical direction through the above-described configuration of the ultrasonic generator 300 which is rotated vertically.

Figure 5:
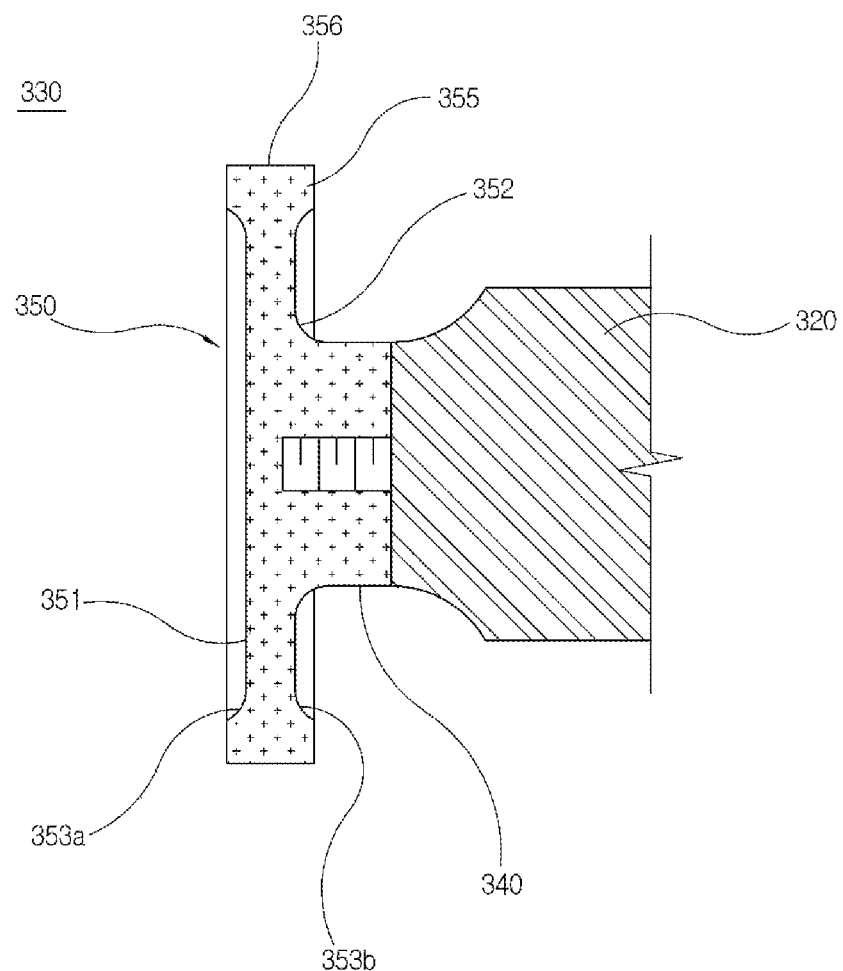
FIG. 5 is a cross-sectional view showing a principal part of an ultrasonic horn of the welding machine for synthetic resins according to the present invention.

For this purpose, referring to FIG. 5, the ultrasonic horn 330 includes a body 340 which extends from the booster 320.

Further, the ultrasonic horn 330 includes a head 350 which extends from the front end of the body 340 and substantially radiates ultrasonic vibration and, in this case, the ultrasonic horn 330 extending from the front end of the body 340 is provided in a disc shape having a designated thickness so as to protrude outwardly from the body 340 and thus to have a greater diameter than that of the body 340.

In the present invention, the head 350 is configured to guide vibration transmitted from the body 340 to the circumference of the head 350.

In this respect, the head 350 includes a vibration guide plate 351 configured to guide vibration transmitted from the body 340 to a vibration radiation part 355, which will be described later, and the vibration guide plate 351 is provided at the front end of the body 340 so as to have a greater diameter than that of the body 340.

Here, the body 340 extends from the rear surface of the vibration guide plate 351, and a connection curve part 352 configured to smoothly transmit ultrasonic energy is formed at the position of the vibration guide plate 351 to which the body 340 is connected.

Front and rear curve parts 353a and 353b, which are curved to have a designated curvature so as to smoothly transmit ultrasonic energy and to expand the thickness of the vibration guide plate 351, are formed at the circumferences of the front and rear surfaces of the vibration guide plate 351.

Further, the head 350 includes the vibration radiation part 355 configured to receive vibration transmitted from the vibration guide plate 351 and to substantially radiate the vibration so as to apply frictional heat, and the vibration radiation part 355 includes a welding surface 356, which is formed in a circular band shape having a thickness corresponding to the distance between the edges of the front and rear curve parts 353a and 353b, which is greater than the thickness of the vibration guide plate 351, and a designated width, and generates frictional heat through the outer circumferential surface of the welding surface 356.

That is, the ultrasonic generator 300 is configured to generate ultrasonic energy so as to generate frictional heat during a process of welding two fabrics.

The welding unit 400 of the welding machine 1 for synthetic resins according to the present invention presses the fabrics and welds the fabrics using frictional heat in cooperation with the ultrasonic horn 330.

Figure 6:
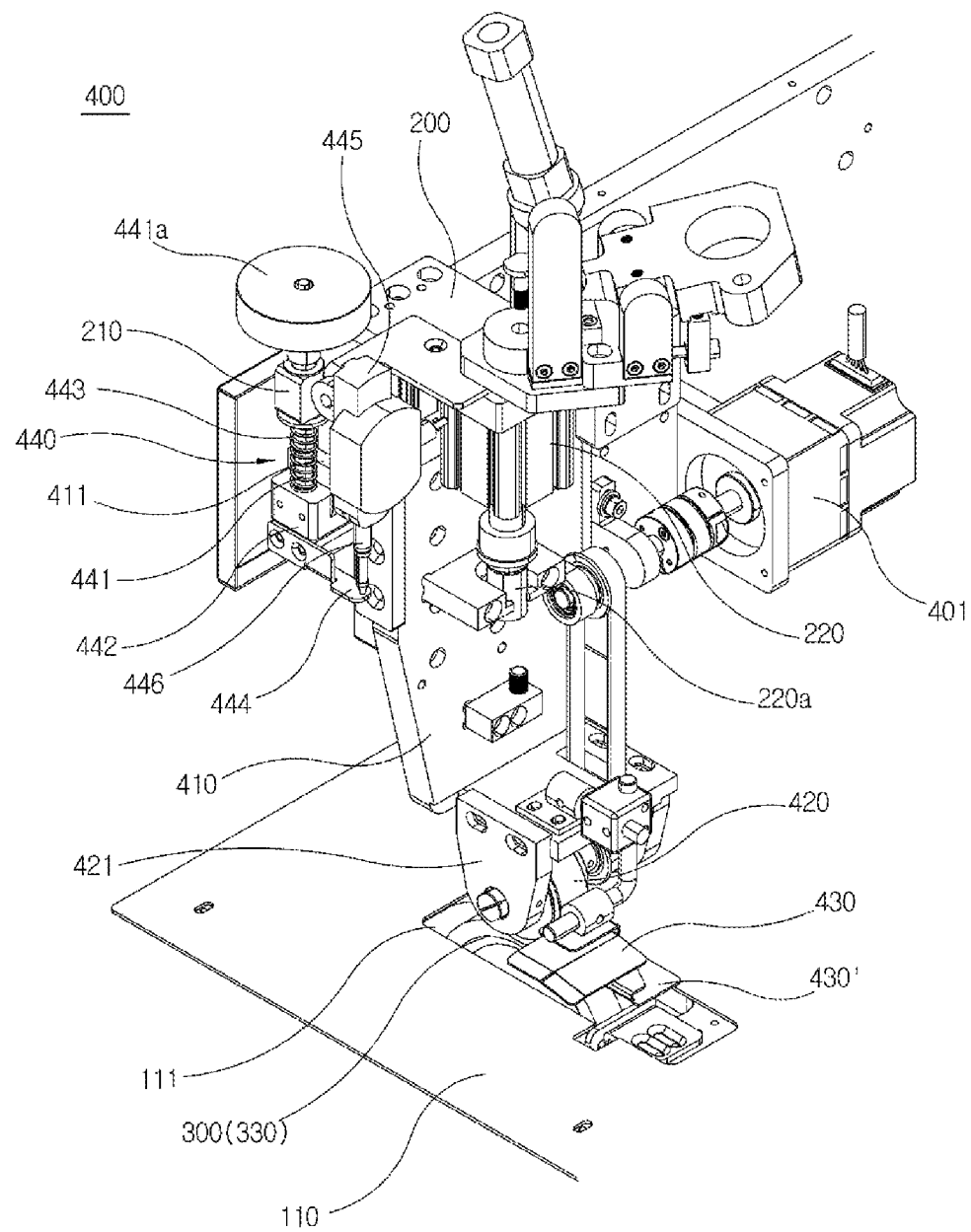
FIG. 6 is a perspective view showing a principal part of a welding unit of the welding machine for synthetic resins according to the present invention.

In this regard, referring to FIG. 6, the welding unit 400 includes an elevating operation plate 410, the elevating operation plate 410 is coupled to the elevating support 200 by a general LM guide so as to be slidable upwards and downwards, and the cylinder rod 220a of the elevating cylinder 220 is coupled to the elevating operation plate 410 so that the elevating operation plate 410 is moved upwards and downwards using the elevating support 200 as a guide by operation of the elevating cylinder 220.

A latch 411 is provided on the outer surface of the elevating operation plate 410, and the latch 411 is configured to limit the downward movement of the elevating operation plate 410 in response to a stroke adjuster 440, which will be described later.

Further, the welding unit 400 includes a welding wheel 420, and the welding wheel 420 is provided as a metal roller having a designated thickness so as to correspond to the ultrasonic horn 330.

Here, the welding wheel 420 is mounted on a roller support 421 through a shaft, the roller support 421 is coupled to the lower end of the elevating operation plate 410 so as to be moved upwards and downwards together with the elevating operation plate 410, and the welding wheel 420 presses the fabrics between the welding wheel 420 and the ultrasonic wheel 330 when the roller support 421 is moved downwards.

In the present invention, the welding wheel 420 is rotated in the vertical direction, and concretely, is rotated in the opposite direction to the ultrasonic horn 330 so as to discharge the fabrics, supplied from the front, rearwards simultaneously with welding of the fabrics.

Here, the welding wheel 420 according to the present invention has rotational force through a rotation structure in which a motor 401 is directly connected to the welding wheel 420 or is connected to the welding wheel 420 through a separate belt pulley or chain sprocket.

Further, the welding unit 400 includes upper and lower fabric guides 430 and 430' configured to guide supply of two fabrics to be welded.

Here, the upper and lower fabric guides 430 and 430' are provided as C-shaped brackets which are opened in opposite directions, the upper fabric guide 430 is provided in front of the roller support 421, and the lower fabric guide 430' is provided on the work table 110, thereby supplying the two fabrics to be welded to upper and lower regions so as to stably overlap each other.

Further, the welding unit 400 includes the stroke adjuster 440 configured to adjust the lowering stroke distance of the elevating operation plate 410, which is moved upwards and downwards, so as to adjust fabric pressing force of the welding wheel 420.

Figure 7:
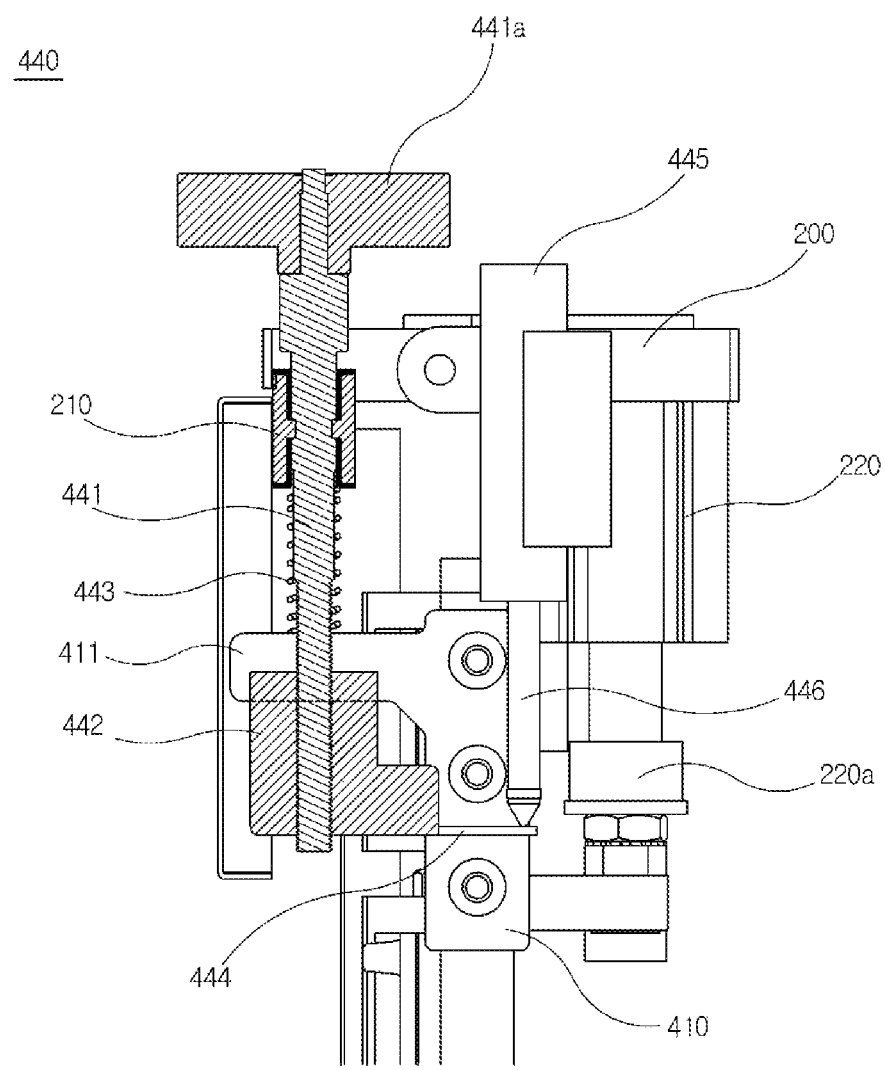
FIG. 7 is a side view showing a principle part of a stroke adjuster of the welding machine for synthetic resins according to the present invention.

In this regard, as shown in FIG. 7, the stroke adjuster 440 includes a screw 441 having a screw thread formed on the lower part thereof, the screw 441 is vertically mounted in the screw mount part 210 of the elevating support 200 through a shaft so that the lower part of the screw 441 is exposed, and an adjuster handle 441a is provided on the upper end of the screw 441 so as to be rotatable.

Further, the stroke adjuster 440 includes a stopper 442 screw-coupled to the lower part of the screw 441, having a spring 443 provided between the upper part of the stopper 442 and the screw mount part 210 so as to surround the screw 441, and configured to ascend and descend along the screw 441 when the screw 441 is rotated, and the latch 411 of the elevating operation plate 410 is latched to the upper part of the stopper 442.

Here, the stopper 442 is connected to the elevating support 200 by guide recesses and protrusions (not shown), and thereby, ascent and descent of the stopper 442 is guided by the elevating support 200.

A scale measurement table 444 configured to come into contact with a measurement rod 446 of a scale 445, which will be described later, is provided at one side of the stopper 442.

Further, the stroke adjuster 440 includes the scale 445 configured to interfere with the scale measurement table 444 so as to measure the lowering stroke distance of the elevating operation plate 410.

Here, the scale 445 may have any structure configured to eject the measurement rod 446 so as to measure a distance and, in the present invention, the scale 445 is vertically mounted on the elevating support 200 such that the measurement rod 446 comes into contact with the scale measurement table 444.

Accordingly, the scale 445 is configured such that the measurement rod 446 responds to the scale measurement table 444, and may thus measure the lowering stroke distance of the elevating operation table 410 when the elevating operation plate 410 is lowered and the latch 411 is latched to the stopper 442, starting from a zero point, i.e., a position at which the elevating operation plate 410 is elevated by inserting the cylinder rod 220a into the elevating cylinder 220, and may output the measured stroke distance through the control panel (not shown), which may display data, provided on the main body 100.

That is, the welding wheel 420 of the welding unit 400 and the ultrasonic horn 330 in cooperation with each other may generate frictional heat, may press and weld the fabrics entering the gap between the ultrasonic horn 330 and the welding wheel 420, and particularly, may accurately adjust the pressing force applied to the fabrics depending on the thickness or the kind of the fabrics, thereby being capable of facilitating stable welding of the fabrics.

The hot air generator 500 of the welding machine 1 for synthetic resins according to the present invention applies hot air to the supplied fabrics, and thus preheats the fabrics, prior to ultrasonic welding of the fabrics.

Figure 8:
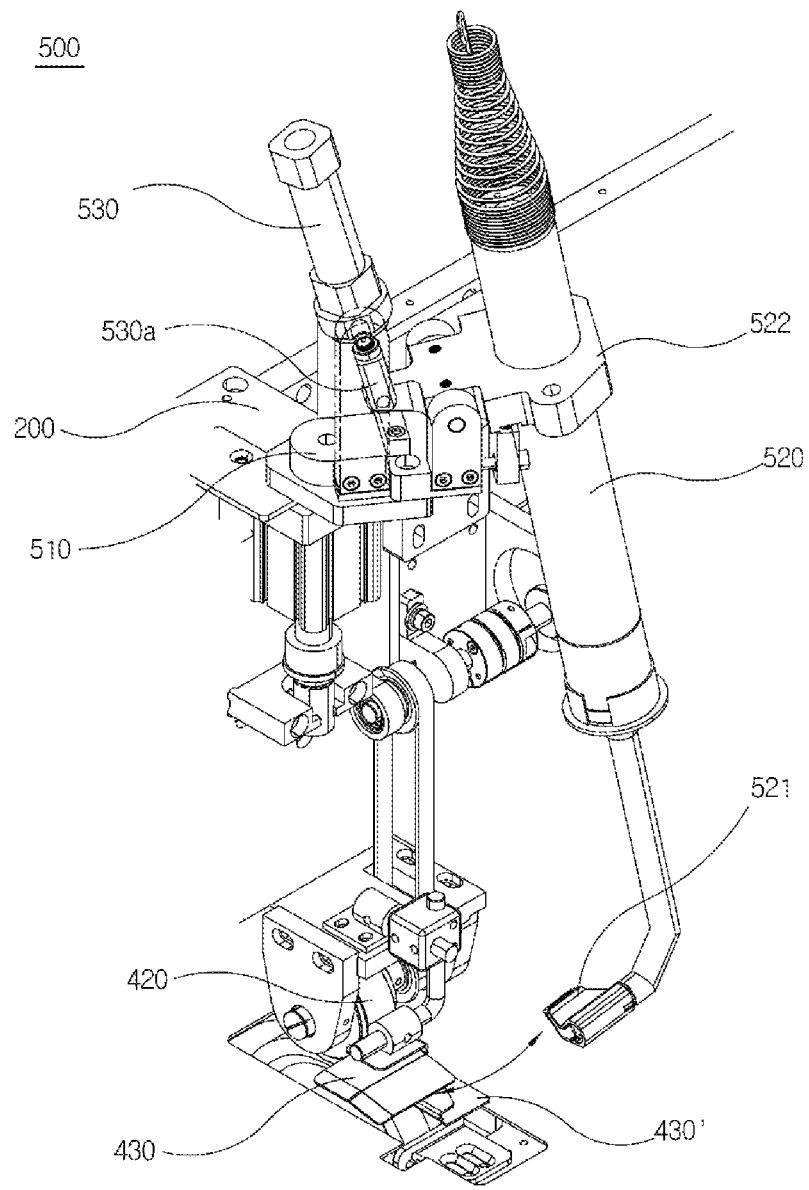
FIG. 8 is a perspective view showing a principal part of a hot air generator of the welding machine for synthetic resins according to the present invention.

In this regard, as shown in FIG. 8, the hot air generator 500 includes a heater rod mount plate 510 provided on one side of the upper surface of the elevating support 200.

Further, the hot air generator 500 includes a heater rod 520 axially coupled to the heater rod mount plate 510 by a rotating plate 522 provided at the upper part of the heater rod 520 so as to be rotatable leftwards and rightwards.

A hot air discharge nozzle 521 is provided at the lower end of the heater rod 520, and the hot air discharge nozzle 521 discharges hot air generated by the heater rod 520 to the fabrics supplied below the hot air discharge nozzle 521.

In the present invention, the heater rod 520, which is generally applied to conventional hot air welders, may be used, and may have any structure which may generate and discharge hot air.

Further, the hot air generator 500 includes a rotating cylinder 530 mounted on the heater rod mount plate 510 so as to be rotatable, and a cylinder rod 530a is connected to the rotating plate 52 so as to rotate the heater rod 520 leftwards and rightwards through insertion and withdrawal of the cylinder rod 530a into and from the rotating cylinder 530.

That is, the hot air generator 500 is configured such that, when the lower end of the heater rod 520 is rotated, and concretely, rotated to the left in the figure, the hot air discharge nozzle 521 is located between the upper and lower fabric guides 430 and 430' and discharges hot air to the upper and lower fabrics.

Hereinafter, operation of the welding machine 1 for synthetic resins according to the present invention having the above-described configuration will be described in detail with reference to the accompanying drawings.

As shown in FIGS. 1 to 8, the welding machine 1 for synthetic resins according to the present invention may stably and rapidly weld fabrics having a comparatively large thickness or fabrics coated with a polymer without damaging the coating surfaces of the fabrics through preheating of the fabrics and ultrasonic welding, may achieve smooth supply and discharge of the fabrics, and particularly, may implement stable welding of the fabrics by providing stable pressing force to the fabrics depending on the thickness and kind of the fabrics.

First, the welding machine 1 for synthetic resins according to the present invention adjusts the lowering stroke distance of the welding wheel 420, i.e., the elevating operation plate 410, depending on the kind of fabrics to be welded. Here, the degree of pressing of the welding wheel 420 against the fabrics is adjusted through the stroke of the elevating operation plate 410.

Adjustment of the stroke distance is achieved by controlling rotation of the screw 441, and the stopper 442, into which the screw 441 is inserted, ascends and descends.

Figure 9:
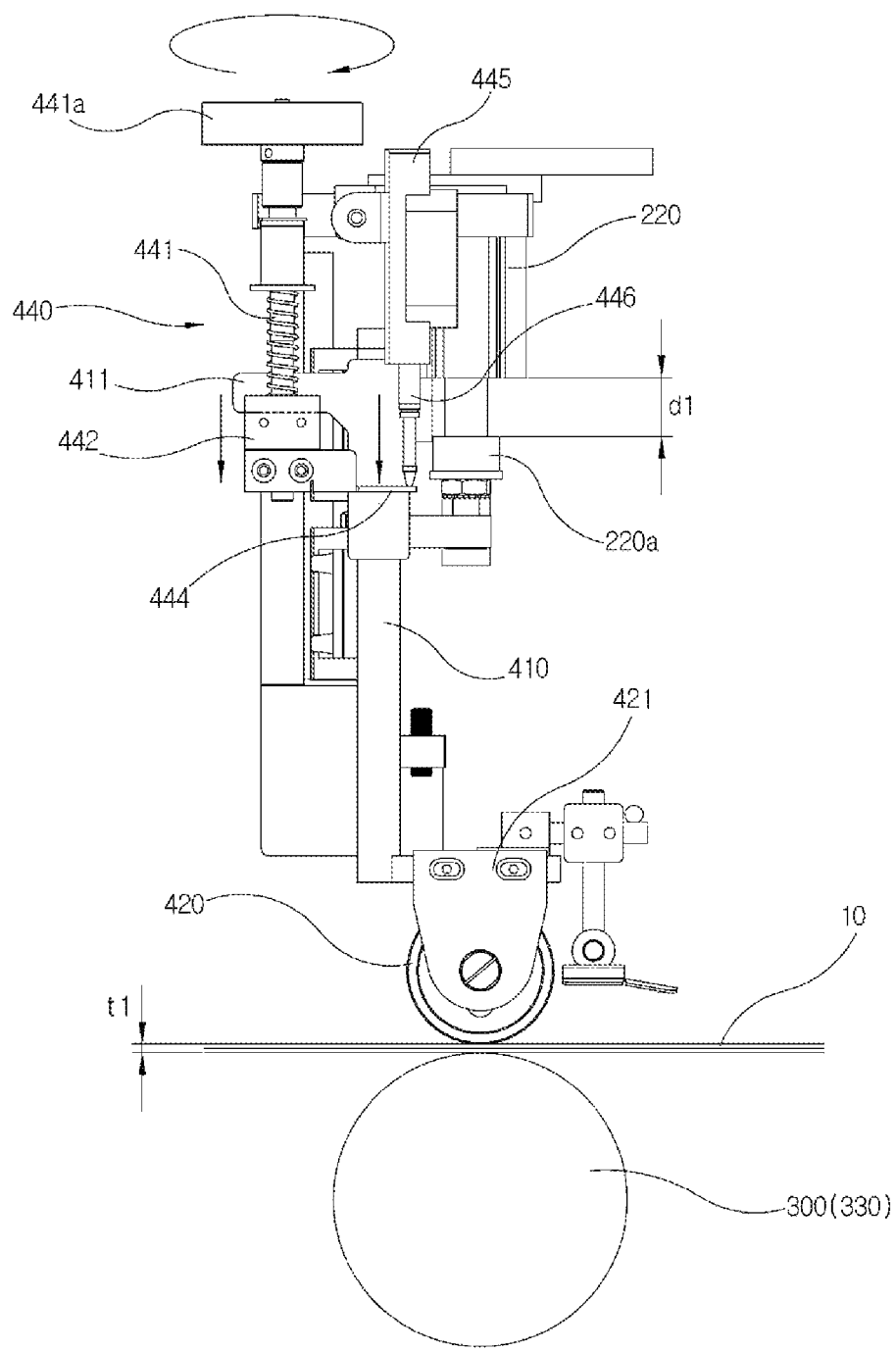
FIG. 9 is a side view of the welding machine for synthetic resins according to the present invention in the state in which the stroke thereof is adjusted.

First, referring to FIG. 9, when fabrics 10 having a relatively small thickness t1 are used, the welding wheel 420 is lowered more downwards than in the case in which fabrics having a general thickness are used, by descending the stopper 442.

When the elevating operation plate 410 is lowered by operation of the elevating cylinder 220, the latch 411 provided on the elevating operation plate 410 allows the cylinder rod 220a to descend to a long distance d1 by the descent height of the stopper 442, and the lowering stroke distance of the welding wheel 420 is also increased, thereby being capable of stably pressing the fabrics 10.

Figure 10:
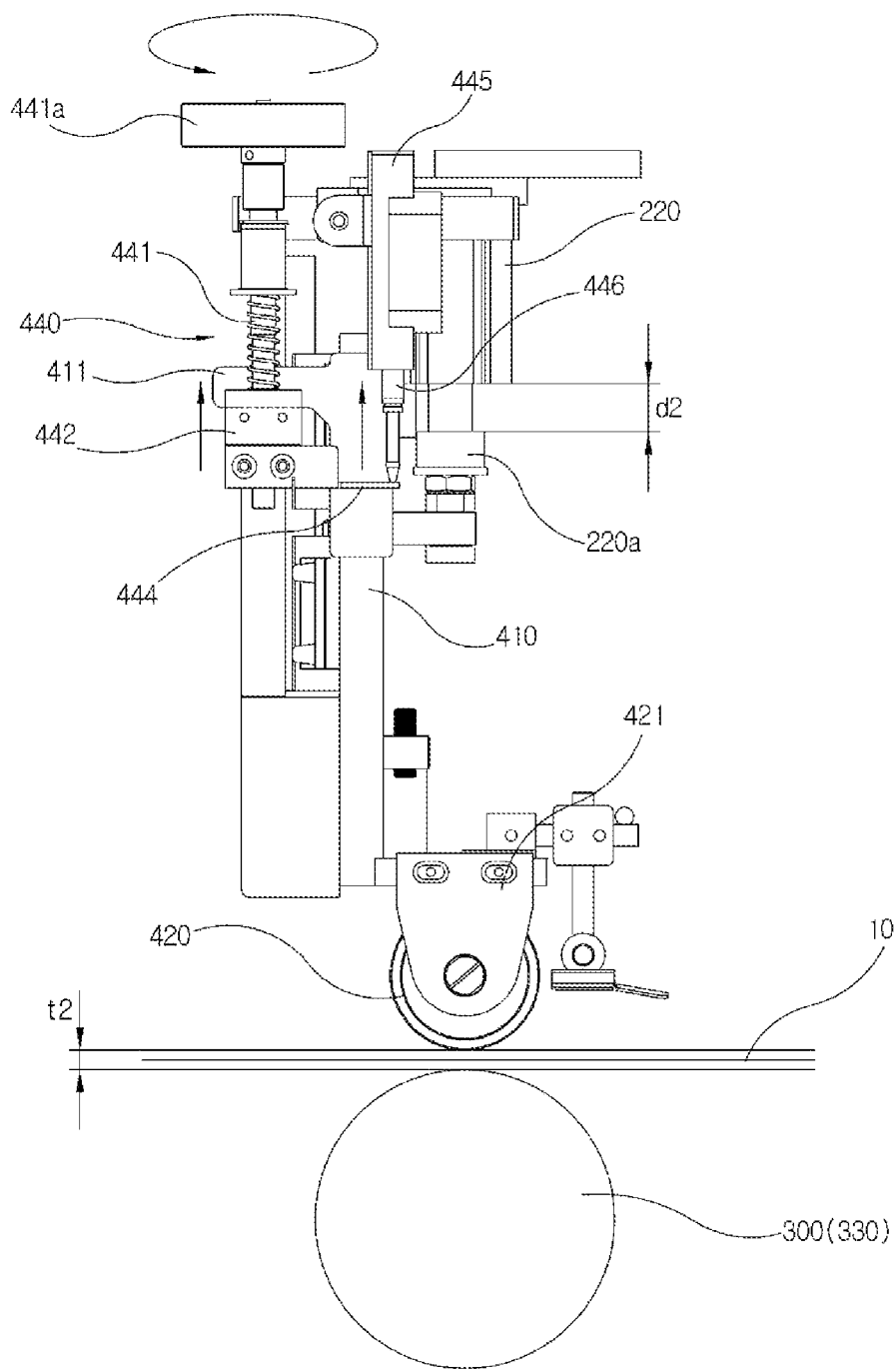
FIG. 10 is a side view of the welding machine for synthetic resins according to the present invention in the state in which the stroke thereof is adjusted.

Further, referring to FIG. 10, when fabrics 10 having a relatively large thickness t2 are used, the welding wheel 420 is elevated upwards by ascending the stopper 442.

When the elevating operation plate 410 is lowered by operation of the elevating cylinder 220, the latch 411 provided on the elevating operation plate 410 allows the cylinder rod 220a to descend to a short distance d2 by the ascent height of the stopper 442, and the lowering stroke distance of the welding wheel 420 is also decreased, thereby being capable of stably pressing the fabrics 10.

Further, in the present invention, the adjusted state of the stroke may be accurately measured by the scale 445, and may be output.

That is, the measurement rod 446 of the scale 445 comes into contact with the scale measurement table 440 by ascent and descent of the stopper 442, and thus measures the stroke distance, and more particularly, measures the lowering distance of the elevating operation plate 410 until the latch 411 is latched to the stopper 442, and the stroke distance may be output through the main body 100 so that the adjusted state of the stroke may be accurately checked.

Thereafter, a method for welding the fabrics 10 in the state in which the stroke is adjusted, as described above, will be described.

Figure 11:
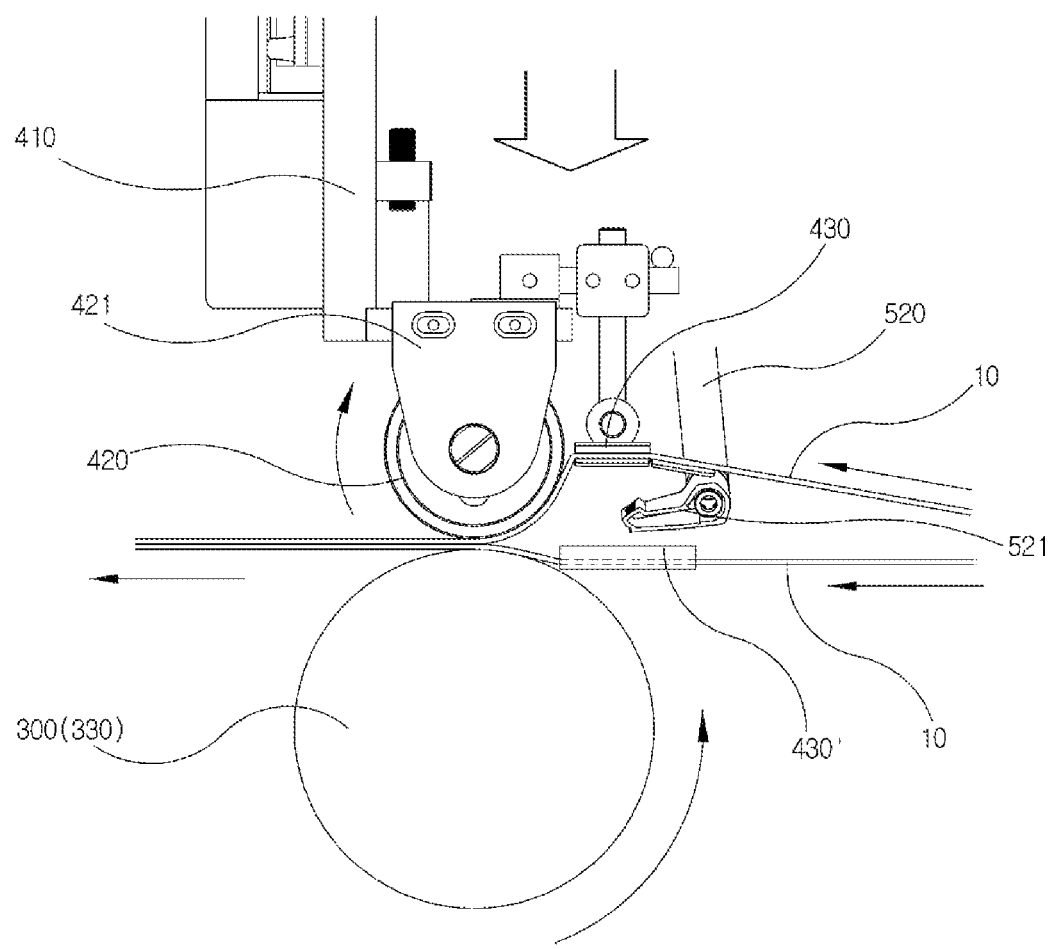
FIG. 11 is a side view of the welding machine for synthetic resins according to the present invention in the state in which fabrics are welded.

Referring to FIG. 11, in order to weld the fabrics 10, first, the elevating operation plate 410 is primarily lowered by operating the elevating cylinder 220, and thereby, the welding wheel 420 is lowered to be close to the upper surface of the ultrasonic horn 330.

Thereafter, the fabrics 10 to be welded are supplied, and concretely, the two fabrics 10 are loaded into the upper and lower fabric guides 430 and 430', respectively.

Thereafter, welding is substantially performed, and concretely, the welding wheel 420 is secondarily lowered, and thereby, the welding wheel 420 is lowered to be closer to the ultrasonic horn 33 so as to press the fabrics 10 located between the welding wheel 420 and the ultrasonic horn 330, and the welding wheel 420 and the ultrasonic horn 330 are rotated in opposite directions.

Further, together with operation of the welding wheel 420 and the ultrasonic horn 330, the heater rod 520 is operated, and concretely, the lower end of the heater rod 520 is rotated from the right to the left in this figure by operation of the rotating cylinder 530, and thus, the hot air discharge nozzle 520 is located between the upper and lower fabric guides 430 and 430' and discharges hot air to the upper and lower fabric guides 430 and 430' so as to heat the opposing surfaces of the upper and lower fabrics 10 to a designated temperature.

Thereafter, the fabrics 10 to be welded enter the gap between the ultrasonic horn 330 and the welding wheel 420, and the supplied fabrics 10 enter the gap between the ultrasonic horn 330 and the welding wheel 420 in the state in which the fabrics 10 overlap each other, and are melted by frictional heat, and welded between the ultrasonic horn 330 and the welding wheel 420 by pressure.

Here, in the present invention, the supplied fabrics 10 are naturally supplied and discharged due to the rotational force of the ultrasonic horn 330 and the welding wheel 420 in opposite directions, and thereby, the fabrics 10 may be stably supplied and welded.

Figure 12:
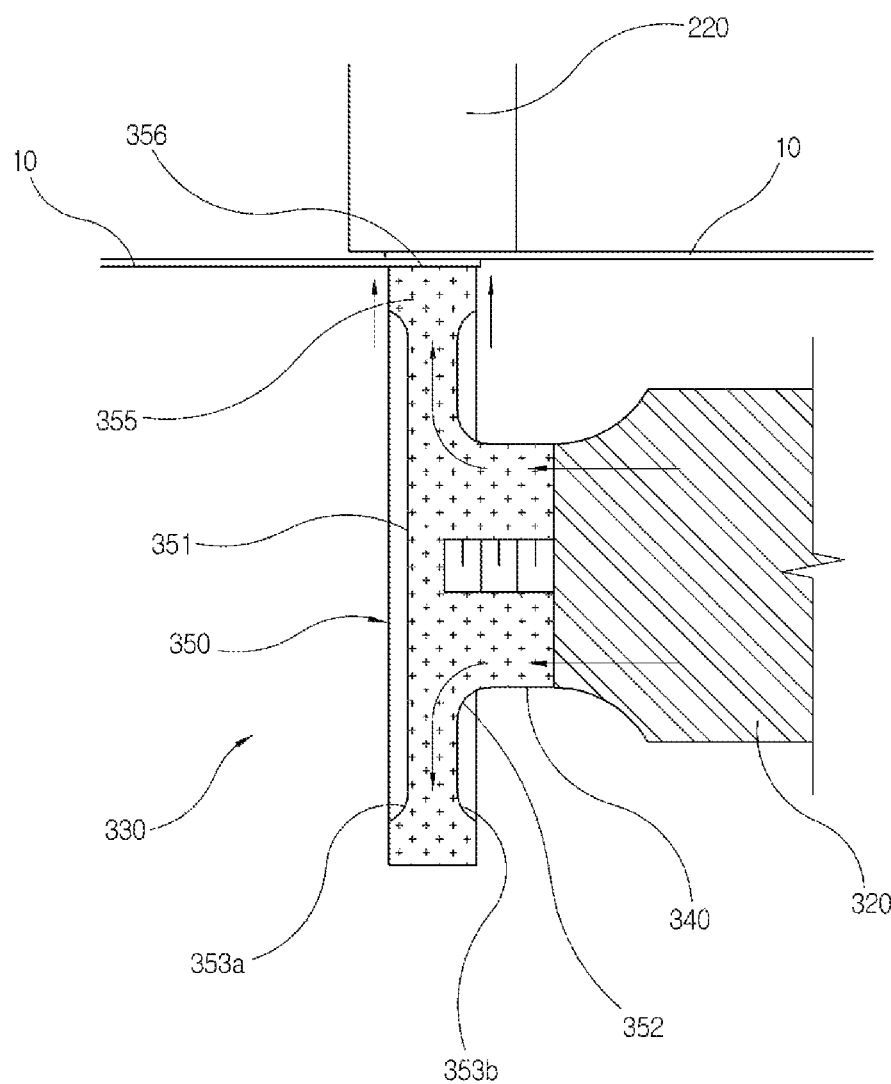
FIG. 12 is a side view of the welding machine for synthetic resins according to the present invention in the state in which ultrasonic vibration energy is applied to the fabrics.

Further, in the present invention, smooth supply of the fabrics 10 may be implemented by structural improvement in the ultrasonic horn 330 and, as shown in FIG. 12, ultrasonic vibration energy transmitted from the booster 320 is transmitted to the front end of the body 340 of the ultrasonic horn 330.

Thereafter, the ultrasonic vibration energy is transmitted to the head 350, and concretely, is naturally transmitted to the vibration guide plate 351 of the head 350 through the connection curve part 352 connected to the front end of the body 340, and is uniformly transmitted to the circumference of the vibration guide plate 351 through change of direction at a right angle in a disc shape.

Thereafter, the ultrasonic vibration energy transmitted to the vibration guide plate 351 is transmitted to the vibration radiation part 355, and concretely, is naturally transmitted to the vibration radiation part 355 through the front and rear curve parts 353a and 353b formed on the circumference of the vibration guide plate 351.

Thereby, the ultrasonic vibration energy transmitted to the vibration radiation part 355 is radiated through the front end surface thereof, i.e., the welding surface 356 forming the circumferential surface of the vibration radiation part 55, and, when the radiated ultrasonic vibration energy is transmitted to the fabrics 10 between the ultrasonic horn 330 and the welding wheel 420, frictional heat is momentarily generated on the bonding surface between the fabrics 10, and a synthetic resin is melted and thus causes strong molecular bonding between the fabrics 10.

As described above, the welding machine for synthetic resins according to the present invention may facilitate rapid welding of fabrics through preheating of the fabrics and concentrated molecular decomposition on the bonding surface between the fabrics, may achieve smooth entry and discharge of the fabrics through a structure in which both the ultrasonic horn and the welding wheel are rotated vertically in opposite directions, and may allow the stroke adjuster to easily adjust pressing force applied to the fabrics depending on the kind of the fabrics to be welded.

As is apparent from the above description, the present invention provides a welding machine for synthetic resins which may preheat the bonding surface between overlapping fabrics using a hot air generator and may successively perform welding of the fabrics using ultrasonic waves, and may thus achieve preheating of the fabrics to be welded using hot air and concentrated molecular decomposition on the bonding surface between the fabrics and welding of the fabrics using frictional heat caused by ultrasonic waves, thereby being capable of greatly improving workability in welding.

Further, the welding machine for synthetic resins according to the present invention is configured such that an ultrasonic horn is rotated vertically in an opposite direction to a welding wheel, which is rotated vertically, so as to radiate ultrasonic waves through the circumferential surface of the ultrasonic horn, and may thus achieve stable entry of the fabrics and prevent the fabrics from slipping during a process of welding the fabrics, thereby being capable of improving workability and minimizing defects in welding.

In addition, the welding machine for synthetic resins according to the present invention may facilitate stable welding of the fabrics depending on the thickness or the material of the fabrics through adjustment of the lowering stroke of the welding wheel.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A welding machine for synthetic resins comprising:
a main body comprising a work table provided at a middle part of the main body so as to protrude toward one side and having a horn withdrawal hole formed there through, and a support arm provided at an upper part of the main body so as to protrude upwardly from the work table;
an elevating support provided on the support arm, and comprising a screw mount part protruded from one side of an upper part of the elevating support, and an elevating cylinder configured such that a cylinder rod is provided therein so as to be withdrawn downwards from the elevating cylinder;
an ultrasonic generator comprising a vibrator, a booster and an ultrasonic horn, provided under the work table, rotated vertically by driving a motor, and configured to generate ultrasonic vibration through a circumferential surface of the ultrasonic horn;
a welder provided on the elevating support, being configured to be elevated and lowered by operation of the elevating cylinder, and configured to press fabrics and to generate frictional heat in cooperation with the ultrasonic horn so as to join the fabrics; and
a hot air generator provided on the elevating cylinder, and rotated rotatable leftwards and rightwards to provide hot air to the fabrics,
wherein the ultrasonic horn comprises:
a body connected to the booster; and
a disc-shaped head protruded outwards from a front end of the body so as to radiate the vibration through a protruding circumference of the head,
wherein the head comprises:
a vibration guide plate connected to the front end of the body by a connection curve part, provided in a disc shape having a greater diameter than a diameter of the body, and having front and rear curve parts respectively formed at circumferences of front and rear surfaces of the vibration guide plate so as to expand a thickness of the vibration guide plate; and
a vibration radiation part connected to the front and rear curve parts, and having a welding surface formed on an outer circumferential surface of the vibration radiation part.

2. The welding machine for synthetic resins according to claim 1, wherein the welder comprises:
an elevating operation plate coupled to the elevating support so as to be slidable upwards and downwards, configured such that the cylinder rod is connected to the elevating operation plate, and having a latch provided on one side of the elevating operation plate;
a welding wheel mounted at a lower end of the elevating operation plate by a roller support, rotatable vertically in an opposite direction to the ultrasonic generator by driving the motor, and configured to weld the fabrics in cooperation with the ultrasonic horn;
a pair of upper and lower fabric guides provided on the roller support and the work table so as to guide entry of the fabrics to be welded, respectively; and
a stroke adjuster provided on the elevating support so as to adjust a lowering stroke distance of the elevating operation plate by locking the latch.

3. The welding machine for synthetic resins according to claim 2, wherein the stoke adjuster comprises:
a screw mounted vertically in a screw mount part of the elevating support so that a lower part of the screw is exposed, and having an adjuster handle provided on an upper end of the screw;
a stopper screw-coupled to the lower part of the screw, having a spring provided on an upper part of the stopper and a scale measurement table provided at one side of the stopper, and configured such that the stopper ascends and descends using the elevating operation plate as a guide when the screw is rotated, wherein the latch is latched to an upper part of the stopper when the elevating operation plate is lowered; and
a scale mounted on an upper part of the elevating support, and having a measurement rod provided to protrude downwards from the scale and configured to measure the lowering stroke distance of the elevating operation plate through interference with the scale measurement table.

4. The welding machine for synthetic resins according to claim 1, wherein the hot air generator comprises:
a heater rod mount plate provided on an upper surface of the elevating support;
a heater rod mounted on the heater rod mount plate by a rotating plate so as to be rotated leftwards and rightwards, and having a hot air discharge nozzle provided at a lower end of the heater rod and configured to discharge the hot air to the fabrics so as to preheat the fabrics; and
a rotating cylinder mounted on the heater rod mount plate so as to be rotatable, and configured such that the cylinder rod is connected to the rotating plate so as to control rotation of the heater rod.

* * * * *